Patented Apr. 28, 1953

2,636,883

UNITED STATES PATENT OFFICE 2,636,883

THIENYL KETONES

Alva C. Byrns, Los Altos, Calif., assignor to Union Oil Company of California, Los Angeles, Calif., a corporation of California No Drawing. Application January 31, 1945, Serial No. 575,552

4 Claims. (Cl. 260—332.3)

This invention relates to the production of sulfur-containing ketones and especially to a method for their preparation which involves the acylation of a thiophene type compound with an organic acid anhydride in the presence of an acylation catalyst.

It is shown in U. S. Patent No. 2,315,046 that branched chain olefins may be acylated by organic acid anhydrides to form unsaturated ketones in the presence of certain catalysts, but will form saturated chloroketones in the presence of aluminum chloride. As far as is known however, little or no investigation has been made of the possible reactions between sulfur compounds and organic acid anhydrides in the presence of acylation catalysts.

It has now been discovered that organic sulfur compounds may be reacted with organic acid anhydrides to form sulfur-containing ketones and other carbonyl compounds in the presence of acylation catalysts. As an example of the invention, employing as the sulfur compound, acetic anhydride as the acid anhydride and zinc chloride as the catalyst, the following preparation has been carried out: 5 g. of zinc chloride were added to 20 ml. of acetic anhydride. The mixture was warmed to dissolve the zinc chloride. When 5 ml. of pure thiophene was added to this solution, the resulting mixture became warmer and turned quite brown. Upon gentle heating below the boiling point of the thiophene, further darkening of the mixture occurred and all of the thiophene disappeared. The resulting product was diluted with 250 ml. of water and the aqueous solution was extracted with ether. Evaporation of the ether extract gave a liquid which was identified as largely acetothienone, being as follows:

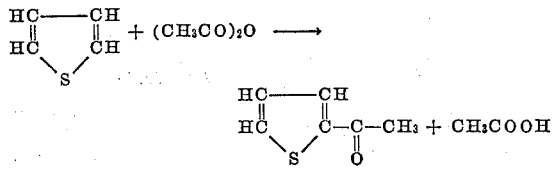

In a similar experiment employing methyl thiophene in place of thiophene, 2-methyl, 5-acetylthiophene was obtained. This product was very similar to acetophenone in its odor, solvency, and melting point and volatility characteristics and should prove to be at least as useful. 2, 5-dimethyl thiophene also reacts readily to yield 2, 5-dimethyl 4-acetylthiophene.

The above type of reaction will also occur with higher thiophenes and mixtures of thiophenes with hydrocarbons, as shown by a second example employing a cracked petroleum fraction comprising a mixture of sulfur compounds and hydrocarbons, the sulfur compounds being largely thiophene homologs. The types of sulfur compounds found in petroleum fractions and methods for their analysis may be found in the Bureau of Mines Report No. R. I. 3591 issued in December 1941, by John S. Ball. The feed stock employed in this case was a fraction boiling between about 300° F. and 400° F. and containing 4.37 sulfur. It was obtained by a viscosity reduction type of cracking operation carried out on a residuum from a high sulfur Santa Maria Valley, California crude oil, followed by distillation of the product to obtain the desired fraction. About 50 ml. of the above fraction was mixed with 10 ml. of acetic anhydride. About 2 g. of anhydrous zinc chloride was added to the mixture which resulted in a slight temperature increase and a marked darkening in color. After standing at room temperature for four hours and warming on a hot plate and cooling for another fifteen minutes the product was poured into 500 ml. of water and allowed to stand over night. Two phases were formed, the bulk of the ketone being in the lower, aqueous phase. The gasoline phase was decanted, water washed and filtered and its sulfur content was found to have been reduced to 3.17%. The aqueous phase was extracted with ether and upon evaporation of the ether about 3 g. of a heavy brown oil similar to the above acetothienone was obtained.

Further work has shown that the reaction is not confined to thiophene and its homologs but will also take place with thiophanes and alkyl sulfides. This was shown in a third example in which 15 g. of zinc chloride and 12 ml. of acetic anhydride were mixed and to the mixture was added 10 ml. of amyl sulfide. A small amount of heat was liberated and a homogeneous viscous liquid of deep red-brown color was formed. This was warmed for a two-hour period and then diluted with 100 ml. of water. The product was extracted with ether and the ether extract was neutralized with sodium carbonate solution, treated with decolorizing carbon, filtered, and evaporated to remove the ether. A residue of 9½ ml. of a red colored liquid was obtained, this liquid having a refractive index $n_D$ at 24° C. of 1.4650 (the original sulfide had a refractive index $n_D$ at 24° C. of 1.4712). The product was the sulfur ketone indicated below, and the reaction was apparently the following:

$(C_5H_{11})SCH_2(C_4H_9) + (CH_3CO)_2O \longrightarrow$

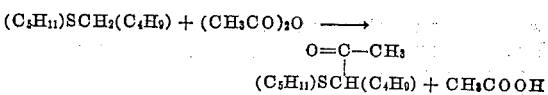

Amyl sulfide + Acetic anhydride → Sulfur ketone + Acetic acid

It has also been found, as with the thiophenes above, that mixtures of sulfides and thiophanes such as are obtained in high sulfur crude gasolines may be reacted as readily as the pure materials. In a fourth example the feed used was a gasoline fraction boiling between about 100° F. and 400° F. and having a sulfur content of 0.63%. This was obtained by distillation of a high sulfur crude from Santa Maria Valley, California. The sulfur compounds present were largely sulfides and thiophanes. 200 ml. of this stock was added to 10 g. of zinc chloride and 10 ml. of acetic anhydride. The mixture was warmed gently for two hours with occasional shaking and let stand over night. The hydrocarbon layer was decanted off and treated with about 5 g. of anhydrous zinc chloride to remove traces of reaction products. It was also washed twice with water and filtered, and its sulfur content was found to have been reduced to 0.30%. The aqueous layer containing the bulk of zinc chloride was hydrolyzed with water and extracted with a mixture of ether and commercial pentanes. The extract was washed with water, filtered and evaporated to remove the solvent. This left an oil which smelled entirely unlike the sulfides present in the original gasoline and was similar to the product obtained from the amyl sulfide above. It consisted largely of sulfur ketones having the following general formulas:

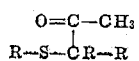

and

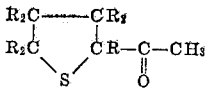

in which the R's represent hydrogen or hydrocarbon groups such as methyl, ethyl, and the like. This is in agreement with the fact that the acyclic and cyclic sulfides (alkyl sulfides and thiophanes) are the predominating types of sulfur compounds in straight-run gasolines, as shown in the Bureau of Mines report referred to above, and that alpha substitution of the acyl group predominates, though not to exclusion, as indicated by the reaction of 2,5-dimethyl thiophene above.

In the above examples acetic anhydride was employed as the acylation agent. It has been found however, that other anhydrides may also be employed. These include propionic anhydride and other acyclic saturated carboxylic acid anhydrides having the general formula

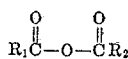

where $R_1$ and $R_2$ are alkyl groups such as methyl, ethyl, isopropyl, butyl and the like, and may be the same or different. $R_1$ and $R_2$ may also be cyclic groups such as cyclopentyl, cyclohexyl, or the corresponding groups present in naphthenic acid anhydrides.

Although the above are preferred, anhydrides of cyclic structure such as succinic anhydride and glutaric anhydride which are saturated, and have the general formula

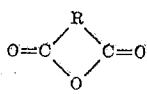

where R is an alkylene radical, may be employed. Phthalic anhydride and maleic anhydride and like anhydrides which are unsaturated or aromatic in character may also be employed. As examples of the use of the latter three anhydrides specifically mentioned, reactions were carried out in which these materials were heated with thiophene and zinc chloride in stainless steel bombs heated to 115° C. (239° F.) for 5 to 10 hours. In all cases reaction occurred. The product is in the case of the succinic anhydride was purified and identified by its melting point as the carboxyl containing sulfur ketone indicated as produced in the following reaction:

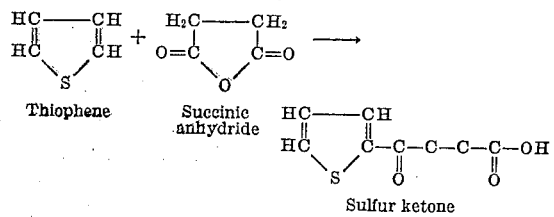

The maleic anhydride product contained a large proportion of polymerized resinous material, and the reaction with the phthalic anhydride occurred only to a limited extent. Carboxyl containing sulfur ketone products were obtained however. They could not be identified by comparison with literature values since they are not described in the literature, but were carbonyl containing sulfur compounds probably having the following formulas:

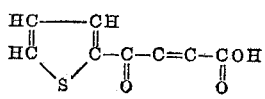

and

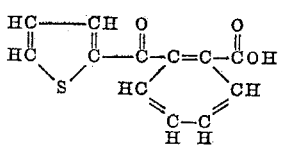

In the examples shown above zinc chloride was employed as the catalyst and this is a preferred catalyst. However, the bromide of the above metal may be used. Other inorganic halides such as boron fluoride and hydrogen fluoride may also be employed as acylation catalysts for these reactions.

It has also been found that in place of the above anhydrides ketene and its homologs may be employed. The relationship between ketene and acetic anhydride becomes clear when it is pointed out that both are anhydrides of acetic acid. Thus by removal of 1 mol of water from 2 mols of acetic acid acetic anhydride is formed; and by removal of 1 mol of water from 1 mol of acetic acid ketene is formed. It is also well known that acetic anhydride is formed by the reaction between acetic acid and ketene as indicated below:

It has been found that ketene may be employed in the place of acetic anhydride in all of the above reactions. In fact the ketene provides for a more economical process in that by its use no byproduct acetic acid is formed. In the above reaction between thiophene and acetic anhydride for example, acetic acid is produced as a byproduct according to the reaction shown, whereas when ketene is employed, no byproduct is produced, the main reaction apparently proceeding as follows:

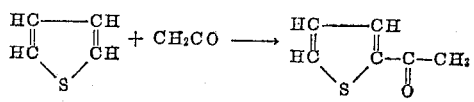

The latter reaction is preferably carried out in the presence of acetic anhydride. In this case the mechanism may be a combination of the acetic anhydride reaction shown above with simultaneous conversion of the byproduct acetic acid by means of the ketene to form additional acetic anhydride. Ketene homologs having the formula R—CH=C=O in which R is hydrogen (ketene itself) or an alkyl group such as methyl, ethyl and the like may be employed in place of the corresponding acid anhydride. For example, methyl ketene in which R is a methyl group may be considered the anhydride of propionic acid or propionic anhydride, and it has been found that methyl ketene can be employed in the above reactions in place of propionic anhydride.

Thus the invention may be said to reside in the production of sulfur-containing carbonyl compounds by reacting organic sulfur compounds with an acid anhydride in the presence of an acylation catalyst at an elevated temperature.

The organic sulfur compounds which are reacted as above are preferably thiophenes such as thiophene itself, methyl thiophene, dimethyl thiophene, ethyl thiophene and the like. Although these lower molecular weight thiophenes having less than about 8 carbon atoms are somewhat more reactive, the higher molecular weight thiophenes having 10 or 20 or more carbon atoms may also be employed. As indicated above these are present in fairly large amounts in the products obtained upon pyrolysis of high sulfur fractions from petroleum, shale, or coal distillation. In such products they are present in admixture with hydrocarbons which are predominantly unsaturated and aromatic in character. Thus by the cracking of a high sulfur crude oil and distillation of the product to yield a narrow boiling fraction in the benzene range it will be found that the benzene fraction so obtained will contain an appreciable quantity of thiophene from which it is separated only with great difficulty since the boiling points of these two materials are very close together. Similarly, a toluene fraction from such a cracked product will contain a relatively large amount of methyl thiophene from which it may be separated only with difficulty. The present invention offers a very convenient method of separating these two materials since the sulfur compounds will react almost quantitatively to form ketones by the above reactions while the aromatic hydrocarbons are substantially unaffected and are thus purified.

As indicated above the thiophene type compounds are found largely in products of pyrolysis of crude oil, coal tar and the like. The saturated compounds such as thiophanes and sulfides are found largely in the straight run fractions from crude oils. They may be separated or concentrated therefrom by extraction with aluminum chloride as in U. S. Patent 2,309,337 or by extraction with ethyl thioglycolic acid, sulfur dioxide and like selective solvents. The gasoline or gas oil fractions or the concentrates obtained therefrom may be reacted for the purposes of this invention. The products will be mixtures of carbonyl-containing compounds and will have excellent characteristics of solvent power or may be used as chemical intermediates. Valuable derivatives of these compounds whether pure or in mixtures may be prepared. For example, by oxidizing acetothienone, the ketone obtained from thiophene and acetic anhydride, the following carboxylic acid may be formed:

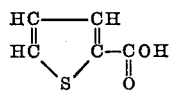

By reduction of acetothienone the corresponding alcohol or hydrocarbon may be produced. Analogous derivatives may be prepared from the sulfur ketones prepared from methyl thiophene as above, or from the other sulfur containing carbonyl compounds of this invention.

Where the term "carboxylic acid derivatives" is employed in the following claims it is meant to include not only the acid anhydrides such as acetic anhydride and the like but the corresponding anhydrides thereof such as ketene and its homologs as described above.

Modifications of this invention which would occur to one skilled in the art are to be included in the invention as defined in the appended claims. This application is a cintinuation-in-part of my copending application Serial No. 511,317 filed November 22, 1943, now U. S. Patent No. 2,463,742.

I claim:

1. The process which comprises reacting a material selected from the class consistsing of thiophene, methyl thiophene and thiophene-containing petroleum distillate fractions with acetic anhydride in the presence of a zinc chloride catalyst, between about 0.13 and 0.17 mole of said catalyst being employed per mole of acetic anhydride.

2. The process for acetylating thiophene which comprises reacting thiophene with acetic anhydride in the presence of a zinc chloride catalyst, approximately 0.17 mole of said catalyst being employed per mole of acetic anhydride.

3. The process for acetylating methyl thiophene which comprises reacting methyl thiophene with acetic anhydride in the presence of a zinc chloride catalyst, approximately 0.17 mole of said catalyst being employed per mole of acetic anhydride.

4. The process for acetylating a thiophene-containing petroleum distillate fraction which comprises reacting said fraction with acetic anhydride in the presence of a zinc chloride catalyst, approximately 0.13 moles of said catalyst being employed per mole of acetic anhydride.

ALVA C. BYRNS.

References Cited in the file of this patent

UNITED STATES PATENTS

| Number | Name | Date |
|---|---|---|
| 2,069,329 | Roelfsema | Feb. 2, 1937 |
| 2,101,560 | Ralston | Dec. 7, 1937 |
| 2,125,968 | Theimer | Aug. 6, 1938 |
| 2,315,046 | Byrns | Mar. 30, 1943 |
| 2,432,991 | Hartough | Dec. 23, 1947 |
| 2,442,027 | Turnbull | May 25, 1948 |

OTHER REFERENCES

Fieser, J. Am. Chem. Soc. 57, 1615 (1933), Q D 1AS.

Thomas, Anhydrous Aluminum Chloride, pp. 874–876, Reinhold Pub. Co., New York, 1941.

Calloway N. O. "Chemical Reviews," vol. 17, pp. 1935, pp. 362, 371, 373, 375, 376 and 377.

Organic Synthesis, Collective Volume 2, (1943), pp. 8 and 9.

Chemical Abstracts 23: 1409[1] (1929).

Chemical Abstracts 25: 2719[3] (1931).